United States Patent
Tronc et al.

(10) Patent No.: US 8,249,585 B2
(45) Date of Patent: Aug. 21, 2012

(54) SYSTEMS, METHODS AND COMPUTER PROGRAM PRODUCTS FOR MOBILITY MANAGEMENT IN HYBRID SATELLITE/TERRESTRIAL WIRELESS COMMUNICATIONS SYSTEMS

(75) Inventors: Jérome Tronc, Sant Jean (FR); Christian Calamarte, Toulouse (FR); Michel Mouly, Paris (FR); Santanu Dutta, Vienna, NC (US)

(73) Assignee: ATC Technologies, LLC, Reston, VA (US)

(*) Notice: Subject to any disclaimer, the term of this patent is extended or adjusted under 35 U.S.C. 154(b) by 54 days.

(21) Appl. No.: 12/715,070

(22) Filed: Mar. 1, 2010

(65) Prior Publication Data
US 2010/0159922 A1    Jun. 24, 2010

Related U.S. Application Data

(62) Division of application No. 11/548,825, filed on Oct. 12, 2006, now abandoned.

(60) Provisional application No. 60/725,813, filed on Oct. 12, 2005.

(51) Int. Cl.
*H04W 4/00* (2009.01)
*H04B 7/185* (2006.01)
*H04L 12/42* (2006.01)

(52) U.S. Cl. ............... 455/429; 455/12.1; 370/453

(58) Field of Classification Search ............ 455/429
See application file for complete search history.

(56) References Cited

U.S. PATENT DOCUMENTS

| | | | |
|---|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,574,660 A | 11/1996 | Diekelman |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS
EP    0 506 255 A2    9/1992
(Continued)

OTHER PUBLICATIONS

Protocol for Internetwork Handover between Terrestrial UMTS and Satellite UMTS networks using Intelligient systems. Aruna Jayasuriya et al. 1998 www.it.rit.edu/ns/proffessional/pubs/older/aruna_conf11.doc.*

(Continued)

*Primary Examiner* — Charles Appiah
*Assistant Examiner* — Natasha Cosme
(74) *Attorney, Agent, or Firm* — Myers Bigel Sibley & Sajovec, P.A.

(57) ABSTRACT

Apparatus, methods and computer program products that support inter-PLMN coordination in registration and handover operations are provided. Hysteresis is introduced in registration of radioterminals in a hybrid terrestrial/satellite mobile communications environment. Inter-PLMN handover techniques are provided, including techniques for coordination of communication of timing information and traffic channel controls.

23 Claims, 6 Drawing Sheets

U.S. PATENT DOCUMENTS

| | | | |
|---|---|---|---|
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,570,858 B1 * | 5/2003 | Emmons et al. | 370/321 |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,107,062 B2 * | 9/2006 | Cruz et al. | 455/453 |
| 7,113,743 B2 | 9/2006 | Karabinis |
| 7,113,778 B2 | 9/2006 | Karabinis |
| 2001/0046841 A1 | 11/2001 | Hart et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192208 A1 * | 9/2004 | Kong et al. | 455/63.1 |
| 2004/0192395 A1 | 9/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 797 319 A2 | 9/1997 |
| EP | 0 831 599 A2 | 3/1998 |
| EP | 1 059 826 A1 | 12/2000 |
| EP | 1 193 989 A1 | 4/2002 |
| EP | 1 531 645 A1 | 5/2005 |
| WO | WO 01/54314 A1 | 7/2001 |
| WO | WO 02/47357 A2 | 6/2002 |
| WO | WO 03/090013 A2 | 10/2003 |

OTHER PUBLICATIONS

Annex to Form PCT/ISA/2006, Communication Relating to the Results of the Partial International Search, PCT/US2006/039893, Mar. 1, 2007.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.
International Search Report, PCT/US2006/039893, Jun. 4, 2007.

* cited by examiner

SYSTEMS, METHODS AND COMPUTER PROGRAM PRODUCTS FOR MOBILITY MANAGEMENT IN HYBRID SATELLITE/TERRESTRIAL WIRELESS COMMUNICATIONS SYSTEMS

CROSS-REFERENCE TO RELATED APPLICATION

The present application is a divisional of U.S. patent application Ser. No. 11/548,825, filed Oct. 12, 2006 now abandoned, and further claims priority to U.S. Provisional Application Ser. No. 60/725,813; filed Oct. 12, 2005, incorporated by reference herein in its entirety.

FIELD OF THE INVENTION

This invention relates to wireless communications systems and methods, and more particularly to hybrid satellite and terrestrial wireless communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively, or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," or simply as a "terminal". As used herein, the term(s) "radioterminal," "radiotelephone," mobile terminal," "user device" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, including space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332. Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) including at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Owing to the greater capacity typical of terrestrial wireless networks, the potential exists for the number of terminals registered in a hybrid network including a satellite subnetwork component and an ancillary terrestrial component (ATC) subnetwork component, to far exceed the capacity of the satellite subnetwork. It is also known that the coverage of terrestrial networks has "coverage holes", i.e. pockets of areas surrounded by covered regions, where there is insufficient signal strength from any base station to execute either an incoming or outgoing call, or both. An exemplary context of this invention is a hybrid wireless network, including a satellite subnetwork and a terrestrial subnetwork with roaming and handover allowed between the two subnetworks and where the coverage of the satellite subnetwork blankets that of the terrestrial subnetwork. In such a hybrid network, unless mitigating measures are taken, a significant number of mobile terminals passing through the coverage hole in the idle mode (when a call is not in progress) will roam to the satellite subnetwork on entering the coverage hole and roam back to the terrestrial network on leaving the coverage hole, assuming that terrestrial access is preferred to satellite access for quality-of-service and cost reasons.

If the two subnetworks are considered distinct Location Areas (LA's), this may involve an LA update. An LA update typically involves a registration in which the mobile terminal communicates with the subnetwork. This communication with the satellite subnetwork, from a large number of mobile terminals passing through a terrestrial coverage hole during a busy hour, may cause a substantial load to the satellite subnetwork, which is typically dimensioned to handing much less traffic, especially from a single spotbeam. This overload may occur even when most of the mobile terminals passing through the coverage hole may not actually engage in any traffic communication with the satellite subnetwork. On leaving the coverage hole, when the mobile terminal senses that terrestrial coverage is again available, it is generally desirable for the mobile terminal to deregister from the satellite subnetwork, which may involve further communication with the satellite subnetwork, and thereby add further load to the latter. For example, in the GSM protocol and its derivatives, such deregistration may include an IMSI Detach procedure. United States Patent Publication No. 2005-0090256, published Apr. 28, 2005, entitled "SYSTEMS AND METHODS FOR MOBILITY MANAGEMENT IN OVERLAID MOBILE COMMUNICATIONS SYSTEMS, and incorporated by reference herein, describes implicit and explicit registration techniques that can reduce such load on the satellite subnetwork.

Traditionally, handovers between Public Land Mobile Networks (PLMNs) have not been performed by the commercial cellular communications industry. Inter-PLMN idle mode roaming is common in conventional systems, but such roaming typically involves a time consuming authentication process designed to ensure that the visiting mobile terminal has the right credentials to receive service from the visited PLMN. Therefore, it may be undesirable to make the full idle mode roaming procedure a component of a handover procedure in a hybrid satellite/terrestrial system.

In GSM, call handover between one base transceiver station (BTS) to another BTS (regardless of whether they belong to the same LA or MSC), say from BTS-A to BTS-B, involves two levels of synchronization. At a first level, the mobile terminal is synchronized in frequency and phase to the forward control channel of BTS-B. This may be achieved by "sniffing" the forward control channels of adjacent cells periodically during idle periods in the TDMA frame. This may be done before the mobile terminal has made the transition to BTS-B and is referred to as pre-synchronization. At a second level, after the handover, the mobile terminal may re-adjust its TDMA frame timing advance to a new value that matches the propagation delay to BTS-B, which, in general, will be different from the propagation delay to BTS-A. This is referred to as post-handover synchronization, or simply post-synchronization, and may be performed synchronously or asynchronously.

In synchronous post-handover synchronization, the new timing advance is known to the mobile terminal a priori. A variety of techniques are used/allowed in legacy GSM systems with respect to acquiring this a priori information, as described, for example, in Michel Mouly and Marie-Bernadette Pautet, *The GSM System for Mobile Communications*, Cell & Sys, 1992, ISBN 2-9507190-0-7, pp. 347-349. The handshaking process in synchronous post-handover synchronization involves the MT sending a small number of access probes (referred to in GSM as RIL3-RR Handover Access messages) to the new BTS (BTS-B), which then activates the new channel, with the new timing advance, in both directions.

In asynchronous post-handover synchronization, no a priori information about the correct timing advance for communication between the MT and BTS-B is used. The correct timing advance is assessed by access probes sent by the MT to BTS-B, and the MT conventionally is forbidden from transmitting on the new channel until the new timing advance is unequivocally established, although reception may be allowed. Handshaking involved in such a process is discussed in Asha Mehrotra, *GSM System Engineering*, Artech House, 1997, ISBN 0-89006-860-7, pp. 147-148.

SUMMARY OF THE INVENTION

Some embodiments of the present invention provide methods of coordinating communications of a radioterminal with a satellite wireless communications network and a terrestrial wireless communications network. A potential degradation of coverage for the radioterminal while registered with a first one of the satellite wireless communications network and the terrestrial wireless communications network is detected. A duration of the degradation of coverage is determined responsive to detecting the potential degradation of coverage while remaining registered with the first one of the satellite wireless communications network and the terrestrial wireless communications network. It is determined whether to register the radioterminal with a second one of the satellite wireless communications network and the terrestrial wireless communications network responsive to whether the determined duration meets a predetermined criterion. For example, registration of the radioterminal with the second one of the satellite wireless communications network and the terrestrial wireless communications network may be foregone responsive to the radioterminal transiting through a coverage hole of the first one of the satellite wireless communications network and the terrestrial wireless communications network before expiration of a predetermined time interval.

In some embodiments, determining a duration of the degradation of coverage may include determining a signal strength for communications between the radioterminal and the first one of the satellite wireless communications network and the terrestrial wireless communications network. Determining whether to register the radioterminal with a second one of the satellite wireless communications network and the terrestrial wireless communications network responsive to whether the determined duration meets a predetermined criterion may include registering the radioterminal with the second one of the satellite wireless communications network and the terrestrial wireless communications network responsive to the signal strength meeting a predetermined level criterion for a predetermined time interval.

In some embodiments, a potential degradation of coverage for the radioterminal while registered with the terrestrial wireless communications network is detected. A duration of the degradation of coverage is determined responsive to detecting the potential degradation of coverage while remaining registered with the terrestrial wireless communications network. The radioterminal may be registered with the satellite wireless communications network responsive to the signal strength meeting a first predetermined level criterion for a first predetermined time interval. Subsequently, a potential improvement of coverage by the terrestrial wireless communications network for the radioterminal is detected while registered with the satellite wireless communications network. A duration of the potential improvement of coverage is determined. The radioterminal is registered with the terrestrial wireless communications network responsive to the determined duration of the potential improvement of coverage meeting a second predetermined level criterion for a second predetermined time interval. The first and second predetermined time intervals may be different, e.g., the second predetermined time interval may be less than the first predetermined time interval.

According to further embodiments of the present invention, an apparatus for coordinating communications of a radioterminal with a satellite wireless communications network and a terrestrial wireless communications network includes a handover controller configured to detect a potential degradation of coverage for the radioterminal while registered with a first one of the satellite wireless communications network and the terrestrial wireless communications network, to determine a duration of the degradation of coverage responsive to detecting the potential degradation of coverage while remaining registered with the first one of the satellite wireless communications network and the terrestrial wireless communications network and to determine whether to register the radioterminal with a second one of the satellite wireless communications network and the terrestrial wireless communications network responsive to whether the determined duration meets a predetermined criterion. The handover controller may be implemented, for example, in one or more components of the terrestrial network, in one or more components of the satellite network and/or in hardware coupled to the terrestrial and satellite network, such as an interconnecting network.

Additional embodiments provide a system including a satellite wireless communications network, a terrestrial wireless communications network and a handover controller configured to detect a potential degradation of coverage for the radioterminal while registered with a first one of the satellite wireless communications network and the terrestrial wireless communications network, to determine a duration of the degradation of coverage responsive to detecting the potential degradation of coverage while remaining registered with the first one of the satellite wireless communications network and the terrestrial wireless communications network and to determine whether to register the radioterminal with a second one of the satellite wireless communications network and the terrestrial wireless communications network responsive to whether the determined duration meets a predetermined criterion. Still further embodiments include a computer program product including program code configured to detect a potential degradation of coverage for the radioterminal while registered with a first one of the satellite wireless communications network and the terrestrial wireless communications network, to determine a duration of the degradation of coverage responsive to detecting the potential degradation of coverage while remaining registered with the first one of the satellite wireless communications network and the terrestrial wireless communications network and to determine whether to register the radioterminal with a second one of the satellite wireless communications network and the terrestrial wireless communications network responsive to whether the determined duration meets a predetermined criterion.

According to further aspects of the present invention, methods are provided for operating first and second public land mobile networks (PLMNs). A call between a radioterminal and the first PLMN is conducted. During the call, transit of the radioterminal into a coverage area of the second PLMN is detected. The radioterminal is handed over to the second PLMN while maintaining the call. A location update of the radioterminal in the second PLMN may be conducted responsive to termination of the call.

In some embodiments, initiation of the call is preceded by exchanging subscriber-registration-related information between the first and second PLMNs, and handing over includes handing over using the exchanged subscriber-registration-related information. The handover may occur without an authentication communication between the radioterminal and the second PLMN based on a trust relationship between the first and second PLMNs. Handover of a second radioterminal to the second PLMN may be denied based on the trust relationship. In some embodiments, handing over is preceded by providing PLMN-identifying information for candidate handover frequencies in the second PLMN to the radioterminal. Methods may also include generating respective records of charges in the first and second PLMNs for the call.

Additional embodiments provide apparatus for supporting interoperation of first and second public land mobile networks (PLMNs). An inter-PLMN handover controller is configured to support a call between a radioterminal and the first PLMN, to detect transit of the radioterminal into a coverage area of the second PLMN during the call, and to hand over the radioterminal to the second PLMN while maintaining the call. A system may include first and second public land mobile networks (PLMNs) and an inter-PLMN handover controller configured to support a call between a radioterminal and the first PLMN, to detect transit of the radioterminal into a coverage area of the second PLMN during the call, and to hand over the radioterminal to the second PLMN while maintaining the call. A computer program product for coordinating operations of first and second public land mobile networks (PLMNs) includes program code configured to support a call between a radioterminal and the first PLMN, to detect transit of the radioterminal into a coverage area of the second PLMN during the call, and to hand over the radioterminal to the second PLMN while maintaining the call.

Additional embodiments of the present invention provide methods of conducting wireless communications. A communications session between a radioterminal and a terrestrial wireless communications system is conducted. A condition for handover of the session from the terrestrial wireless communications system to a satellite wireless communications system is detected. Responsive to detection of the condition for handover, timing information for communications with the satellite wireless communications system is communicated from the terrestrial wireless communication system to the radioterminal. Responsive to the communication of the timing information, a communications session between the radioterminal and the satellite wireless communications system is conducted using the communicated timing information. The timing information may include, for example, information for alignment with a timing epoch. For example, the timing information may include a timing advance. In additional embodiments, the timing information may be determined from information about relative positioning of components the terrestrial wireless communications system and the satellite wireless communications system. For example, the components may include a satellite and a base station antenna.

Further embodiments provide apparatus including a handover controller configured to support a communications session between a radioterminal and a terrestrial wireless communications system, to detect a condition for handover of the session from the terrestrial wireless communications system to a satellite wireless communications system, to communicate timing information for communications with the satellite wireless communications system from the terrestrial wireless communication system to the radioterminal responsive to detection of the condition for handover, and to conduct a communications session between the radioterminal and the satellite wireless communications system using the communicated timing information responsive to the communication of the timing information. A computer program product for supporting wireless communications may include program code configured to support a communications session between a radioterminal and a terrestrial wireless communications system, to detect a condition for handover of the session from the terrestrial wireless communications system to a satellite wireless communications system, to communicate timing information for communications with the satellite wireless communications system from the terrestrial wireless communication system to the radioterminal responsive to detection of the condition for handover and to conduct a communications session between the radioterminal and the satellite wireless communications system using the communicated timing information responsive to the communication of the timing information.

Some embodiments of the present invention provide methods of handing over communications of a radioterminal from a terrestrial wireless communications system to a satellite wireless communications system. A handover command message is communicated from the terrestrial wireless communications system to the radioterminal. Responsive to receipt of the handover command message at the radioterminal, a time interval is provided before terminating a traffic channel between the radioterminal and the terrestrial wireless communications system, e.g., by delaying transmission of a handover command acknowledgment by the radioterminal. The time interval may be sufficient to determine and communicate timing information for the satellite wireless communications system to the radioterminal. The timing interval may be fixed and/or variable. For example, in some embodiments, the time interval may be determined responsive to receipt of a physical information message from the satellite wireless communications system at the radioterminal.

Further embodiments provide a radioterminal including a handover controller configured to receive a handover command message from a terrestrial wireless communications system for handover to a satellite wireless communications system and to wait a time interval before terminating a traffic channel between the radioterminal and the terrestrial wireless communications system responsive to receipt of the handover command message at the radioterminal. A computer program product for controlling handover of a radioterminal from a terrestrial wireless communications system to a satellite wireless communications system may include program code configured to receive a handover command message from the terrestrial wireless communications system and to cause the radioterminal to wait a time interval before terminating a traffic channel between the radioterminal and the terrestrial wireless communications system responsive to receipt of the handover command message at the radioterminal.

DETAILED DESCRIPTION

Figure 1:
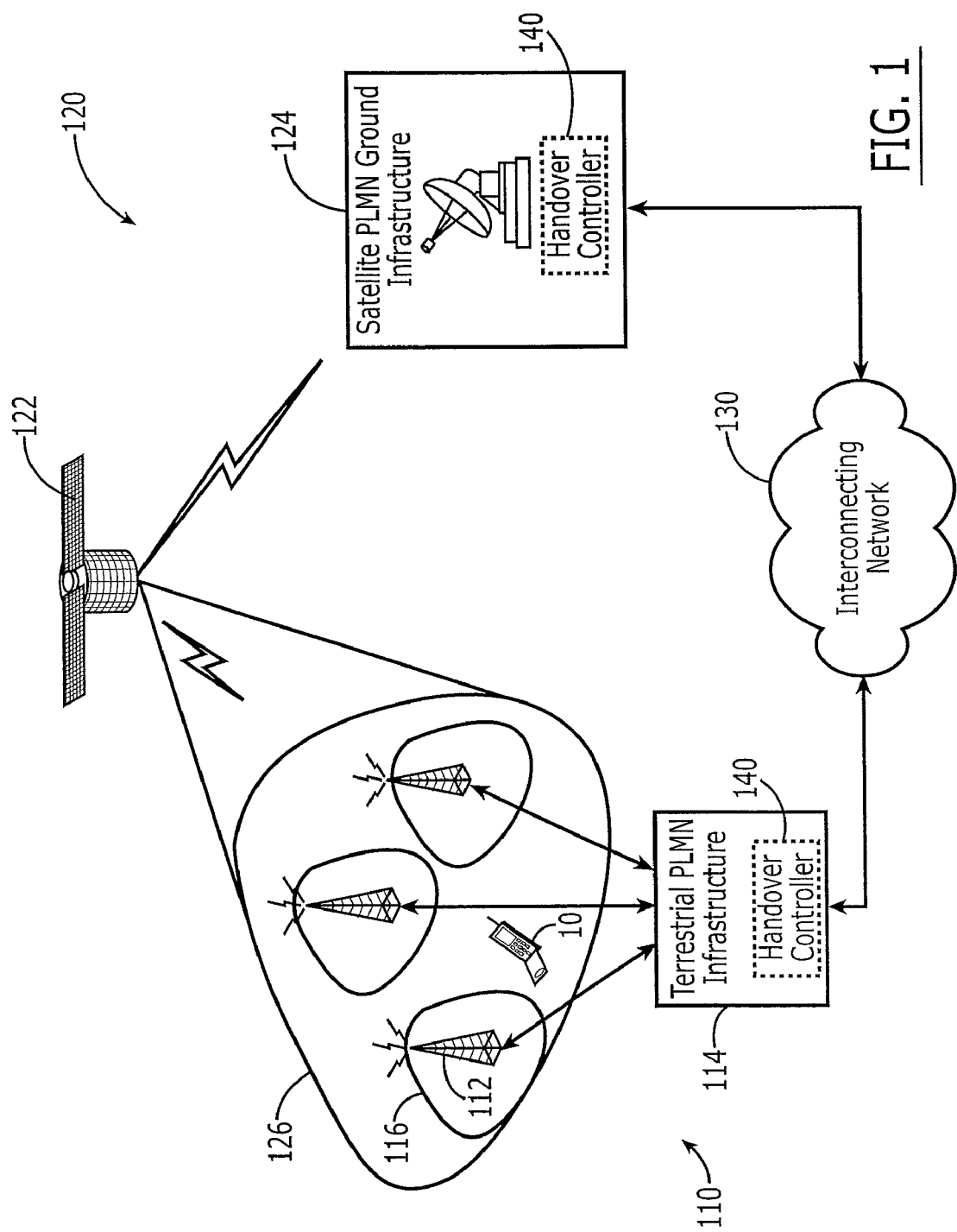
FIG. 1 illustrates a hybrid terrestrial/wireless communications environment according to some embodiments of the present invention.

Specific exemplary embodiments of the invention now will be described with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first radioterminal below could be termed a second radioterminal, and similarly, a second radioterminal may be termed a first radioterminal without departing from the teachings of the present invention. As used herein, the term "and/or" includes any and all combinations of one or more of the associated listed items. The symbol "/" is also used as a shorthand notation for "and/or".

The present invention is described below with reference to block diagrams, message flow diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts illustrated may occur out of the illustrated order. For example, two blocks or message flows shown in succession may in fact be executed substantially concurrently or may sometimes be executed in the reverse order, depending upon the functionality/acts involved. Moreover, the functionality of a given block of a flowcharts, block diagrams and/or signal flow diagram may be separated into multiple blocks and/or the functionality of two or more blocks of the flowcharts and/or block diagrams may be at least partially integrated.

FIG. 1 illustrates a hybrid terrestrial/satellite wireless communications environment according to some embodiments of the present invention. In particular, FIG. 1 illustrates a terrestrial PLMN 110, which includes infrastructure including a plurality of geographically-distributed terrestrial base stations 112 (also referred to base transceiver stations (BTSs) that serve respective coverage areas 116 (e.g., cells), and other PLMN infrastructure 114 (e.g., base station controllers (BSCs), a mobile switching center (MSC) and functional equivalents thereof) that supports call routing, mobility management, billing and other operations in concert with the base stations 112 and provides connectivity with an interconnecting network 130, such as a public switched telephone network (PSTN) and/or packet network. It will be appreciated that the infrastructure of the terrestrial PLMN 110 may be arranged in a number of different ways depending, for example, on the cellular communications standard (e.g., GSM, CDMA, W-CDMA, etc.) supported by the PLMN 110.

As further illustrated in FIG. 1, a satellite PLMN 120 has a coverage area 126. For purposes of illustration, the satellite coverage area 126 is shown overlapping the coverage areas 116 of the terrestrial PLMN 110, but it will be appreciated that, in various embodiments of the present invention, a coverage area of a satellite PLMN that provides service in conjunction with a terrestrial PLMN may completely overlap, partially overlap and/or complement the coverage area of the terrestrial PLMN.

Still referring to FIG. 1, the satellite PLMN 120 includes one or more satellites 122 configured to send/receive signals from radioterminals in the coverage area 216, and supporting ground-based infrastructure 124 that provides call management, billing, mobility management and other functions, and that is configured to provide connectivity to the interconnecting network 130. It will be appreciated that the one or more satellites 122 and infrastructure 124 may, for example, support multiple spot beams that support communication in respective subareas (e.g., cells) of the coverage area 216, and that the infrastructure 124 may include, for example, equipment that supports mobility management and other functions to support communication of a radioterminal as it moves about these various subareas.

Radioterminals 10 may be configured to communicate with both the terrestrial PLMN 110 and the satellite PLMN 120 such that, for example, the satellite PLMN 120 provides coverage when a radioterminal is not within a coverage area of the terrestrial PLMN 110. The terrestrial PLMN 110 may also provide service to a radioterminal 10 when in an area of high user density, to prevent overload of the satellite PLMN 120. It will be appreciated the PLMNs 110, 120 may be operated by the same network operator or by separate operators.

As further illustrated in FIG. 1, according to some embodiments of the present invention, a handover controller 140 may be provided to support handover between the terrestrial PLMN 110 and the satellite PLMN 120. According to various embodiments of the present invention, the handover controller 140 may control various aspects, such as conditions, timing and charging, associated with transferring a call or other communications session of a radioterminal 10 between the PLMNs. As illustrated in FIG. 1, the handover controller 140 may be implemented in components of the terrestrial PLMN and/or the satellite PLMN, e.g., in BSCs and MSCs of the terrestrial PLMN 110 and/or functionally equivalent components of the satellite PLMN 120. It will be understood that, generally, functions of the handover controller 140 may be implemented in a device or devices used to couple the PLMNs (e.g., in the interconnecting network 130) and/or may be implemented in various components of the PLMNs, and that such apparatus may provide handover control operations independent of and/or in concert with operations, such as signal monitoring, conducted by the radioterminal 10.

In some embodiments of the present invention, a registration with a satellite network, e.g., a Location Area (LA) update, such as one conducted along the lines described in the aforementioned U.S. patent application Ser. No. 10/948,606, is delayed by a predetermined time period on entering a terrestrial coverage hole. The delaying may involve, for example:

(a) the mobile terminal (MT) may start a timing counter when it senses that the received signal strength, for example, a average signal strength $T_{avg}$ over a predetermined period, exceeds a threshold value $T_{th}$;

(b) if $T_{avg}$ remains continuously below $T_{th}$ for a counted period, say C, then the MT registers to the satellite subnetwork;

(c) if $T_{avg}$ exceeds $T_{th}$ before the count reaches C, the counter is reset and the MT stays registered in the terrestrial subnetwork.

Variations of the above-described delaying procedures may be implemented in further embodiments of the invention, and generally may be viewed as providing hysteresis in the subnetwork switching process.

The above procedure may ensure that mobiles that are in a coverage hole for a very brief period will not add to the capacity load of the satellite subnetwork. This may eliminate a substantial subset of MTs that pass through a coverage hole from the global set of mobiles that would otherwise immediately want to register on to the satellite subnetwork. However, it is recognized that, during this delay period, the MTs are denied communications service by any subnetwork. Therefore, this technique may be thought as a means to achieve a trade-off, or compromise, between user experience and network complexity and capacity.

A similar process may be followed by the MT for deregistering from the satellite network and switching to the terrestrial subnetwork. In other words, the MT may wait a first predetermined period of time, during which the terrestrial signal, averaged over a second predetermined period of time, continuously exceeds a predetermined threshold value, before a subnetwork switch is initiated. Given that the terrestrial subnetwork may be preferred, the delay period in the switch from the satellite to the terrestrial subnetwork may be shorter than its opposite counterpart.

This approach may also be used to add hysteresis to satellite-to-terrestrial mode transitions, regardless of which method (e.g., one based on delay as described in the present application, or any of the methods based on explicit or explicit registration taught in U.S. patent application Ser. No. 10/948, 606), is used to control the terrestrial-to-satellite mode transition.

Figure 2:
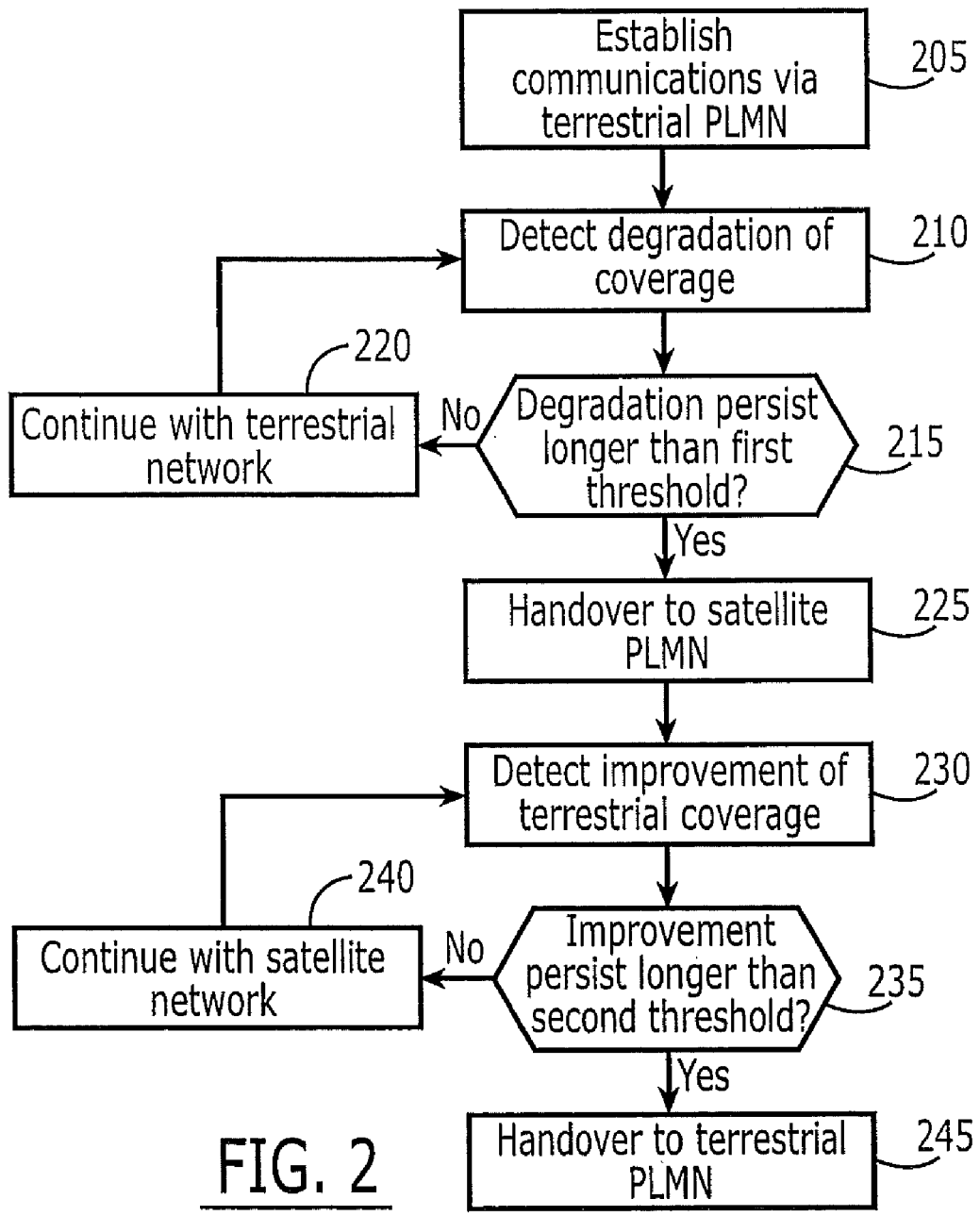
FIG. 2 is a flowchart illustrating handover operations according to some embodiments of the present invention.

FIG. 2 illustrates exemplary operations for handover between terrestrial and satellite networks according to some embodiments of the present invention. A communications session, e.g., a call, of a radioterminal is established with the terrestrial network (block 205). A degradation of coverage is detected (block 210). For example, passage of the radioterminal into a coverage hole of the terrestrial network may be detected using signal strength, bit error and/or other measurements. If the degradation does not persist for greater then a first threshold time period, the session is continued with the terrestrial network (blocks 215, 220). If, however, the degradation persists beyond the first threshold, the session is handed over to the satellite network (blocks 215, 225), and the session continues using the satellite infrastructure. An improvement of coverage by the terrestrial network is subsequently detected (block 230). For example, the radioterminal may pass out of the coverage hole of the terrestrial network and back into a terrestrial coverage area, which may be detected using signal strength, bit error and/or other measurements. If the improvement does not persist for greater than a second threshold time period, the session is continued with the satellite network (blocks 235, 240). If the improvement persists for a sufficient time, however, the session may be handed over to the terrestrial network (block 245).

In conventional wireless protocols, such as GSM, LA update is typically performed in the idle mode (i.e., when a call is not in progress), so that, when a call (either incoming or outgoing) occurs, the MT registration is up to date. An exception to this may occur if an LA change occurs during a call, the LA update may be performed after the call is completed. However, in conventional systems, this may apply only to intra-PLMN handovers. It is noteworthy that, in intra-PLMN handover, there typically is no risk of unauthorized access (as the mobiles credentials have already been checked), which is an issue that can be addressed by the techniques described in the aforementioned U.S. patent application Ser. No. 10/948,606. In some embodiments of the present invention, an alternative to these techniques includes a post-call location update used in intra-PLMN handover adapted and extended to inter-PLMN handovers.

Figure 3:
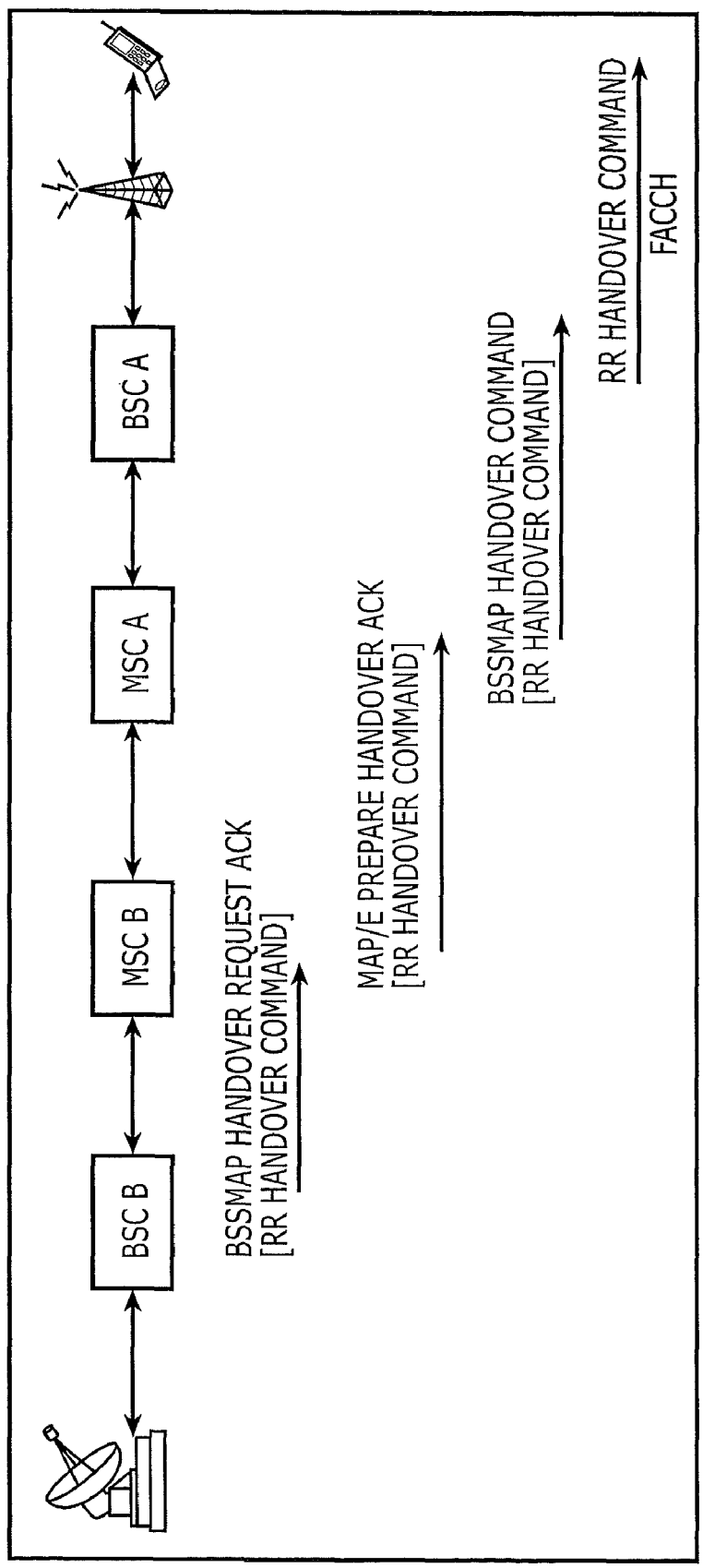
FIGS. 3 and 4 are schematic diagrams illustrating inter-PLMN handover signaling according to some embodiments of the present invention.

In some embodiments, this may be complemented by MT credentials checking at the source. Referring to FIG. 3, according to some embodiments of the invention, substantially all handovers from a source Mobile Switching Center (MSC), MSC-A, of a first network PLMN-A to a destination MSC MSC-B of a second network PLMN-B may be accepted as valid, where the source MSC MSC-A acts as a "filter" to bar MTs not having access rights to the destination satellite network PLMN-B from being handed over. A trust arrangement may be set up between the two networks PLMN-A, PLMN-B. For example, if the destination MSC MSC-B corresponds to a satellite network PLMN, and the source MSC MSC-A belongs to a terrestrial PCS PLMN, the source MSC MSC-A could check the MT's subscription to see if it had the right to roam to the satellite network before handing it over to the satellite network.

Besides MT credentials checking, all other information exchange between the source MSC MSC-A and the destination MSC MSC-B may be performed in a manner similar to conventional intra-PLMN/inter-MSC handover, with the addition of appropriate messages between the two MSCs to implement the exchange of information not required in legacy GSM. Exemplary operations may include: exchange of cell-related information between the two PLMNs, e.g., through operations and maintenance centers (OMCs); implementation of routing Signaling System 7 (SS7) tables allowing the MSCs MSC-A, MSC-B to route to each other (an existing optional function in GSM); and keeping a record of the call time spent in the different networks PLMN-A, PLMN-B in the same call to determine how to apportion the air time bill to the two networks PLMN-A, PLMN-B.

The current GSM standard does not support inter-PLMN handovers. In a hybrid satellite/terrestrial system according to some embodiments of the present invention, a first possible approach to inter-PLMN handover is to adopt handover principles similar to those used in GSM, i.e., the handover decision is taken by the function in charge of the connection prior to the handover (e.g., the Base Station Controller (BSC) or Service Rating Application Protocol (SRAP)), and the MT has essentially a slave role during the whole process. In the following exemplary embodiments described with reference to FIG. 3, a source BSC BSC-A is the BSC in charge of the MT prior the handover, a source MSC MSC-A is the MSC handling the call (the anchor MSC), a destination BSC-B is the BSC (or SRAP) in charge of the target cell and a destination MSC MSC-B (or satellite MSC) in charge of destination BSC BSC-B.

It is assumed that the inter-MSC intra-PLMN handover functionality is supported in both networks. The inter-PLMN case will be analyzed through its differences with inter-MSC intra-PLMN handovers. Generally, no substantial modifications are required in the MT or in the radio interface procedures, inter-MSC procedures directly related to calls can be used as they are currently specified in GSM, and modifications may be made in configurations (such as setting routing tables) and in call charging.

The existing GSM handover process does not require the MT to be aware of which PLMN cells its measurements belong to. For a MT, measurements are done on frequencies that it assumes carry a Broadcast Control Channel (BCCH), taken from a list provided by the source BSC BSC-A prior to the handover. Typically, no information is provided concerning the PLMN to which those frequencies belong, and the MT does not have to fetch or process information that depends on those PLMNs.

In some embodiments of the present invention, the source BSC BSC-A is aware of these frequencies so that it can send them to the MTs. To support inter-PLMN, the source BSC BSC-A is made aware of the frequencies of the cells the MTs might be handed over to. According to some embodiments of the present invention, the first network PLMN-A may know the frequencies of the relevant cells in the second network PLMN-B, and may distribute them to the relevant BSCs. This may require some geographical information on the cells. Other cell-related information may also be required.

The exchange of such configuration data typically is not supported by conventional standardized protocols. In some embodiments of the present invention, a BSC receives information pertaining to cells in other BSCs from an OMC. The implementation of the modification described above could be done by connecting OMCs. It should be noted that the information may change over time. If the update time is short, automatic means might be used, rather than manually entered data.

The MT may report power measurements and the Base Station Identity Code (BSIC) of synchronized-on cells, where one of the cells could be a satellite spotbeam. The BSIC allows solution of ambiguities between cells having the same BCCH frequencies. Such an ambiguity could prevent handing-over to the correct MSC. PLMN A then needs to know the BSIC of the relevant cells in PLMN B, at least in the ambiguous cases. This information is part of the cell-related data, and can be handled as described below.

A handover may be decided by the source BSC BSC-A on the basis of measurements reports from the MT, of measurements done by radio functions and/or on configuration parameters such as threshold values and weighting factors. Some of these parameters are related to the target cells, and are part of the cell-related information. In the case of two terrestrial networks, some other parameters may require comparisons between the originating cell and the target cell (e.g., to establish the boundary). Setting such parameters might require closer collaboration than just sending cell specific parameters.

Once the handover is decided, a new route may be established from the source MSC MSC-A to destination MSC MSC-B to destination BSC BSC-B. The source MSC MSC-A determines destination MSC MSC-B, e.g., source MSC MSC-A is aware of a SS7 address of destination MSC MSC-B. On the other hand, source BSC BSC-A may know the target cell by a pair of parameters (e.g., frequency, BSIC). A first step may be a translation by the source BSC BSC-A of the parameters (e.g., frequency, BSIC) to a cell identity.

The SS7 may route on the basis of the cell identity, e.g., on the Location Area Identity (LAI) part of it, and modification may be needed in the source MSC MSC-A for this phase. The LAI is unique worldwide because it is made up of Mobile Country Code (MCC), Mobile Network Code (MNC) and Local Area Code (LAC), which clearly identify the network and the MSC/VLR in charge of the subscriber. This routing is possible if the SS7 networks are connected (this is the case usually, since this typically is needed for roaming between the two networks) and if SS7 nodes have in their routing tables the data needed to reach the MSCs in the other PLMN. The latter is not necessarily the case in conventional systems. It may be necessary to augment SS7 routing tables to route signaling between MSCs of the two PLMNs. As mentioned, this exists already as an optional function described in GSM specifications. The routing to destination BSC BSC-B may be done in a conventional manner, as the fact that the MT will come from a different PLMN has no impact on this function. The message back from destination MSC MSC-B to source MSC MSC-A allows the establishment of a PSTN connection, assuming the PSTNs are connected.

Still referring to FIG. 3, a RIL3 RR HANDOVER COMMAND message may be generated by the source BSC-B and carried over the different interfaces in different envelopes. For example, as shown in FIG. 3, between the source BSC BSC-B and the source MSC MSC-B, it is encapsulated in a BSSMAP HANDOVER REQUEST ACK, between destination MSC MSC-B and source MSC MSC-A in a MAP/E PREPARE HANDOVER ACK and between source MSC MSC-A and source BSC BSC-A in a BSSMAP HANDOVER COMMAND.

When handovers are restricted to the same PLMN, the source MSC (at the start of the call and managing the call from start to end) may establish a call record covering all radio usage. With inter-PLMN handovers this may no longer be the case, and it may be necessary to maintain some record of the radio usage on a per-PLMN basis. If modifications on the source side are to be limited, one approach is to add a call record in destination MSC MSC-B. However, with the GSM inter-MSC handover procedure, destination MSC MSC-B conventionally would have limited access to subscriber data, and then might have no knowledge of the charging center where to send such a call record. According to some embodiments of the present invention, there are ways to provide this functionality. For instance, if the network PLMN-B (e.g., satellite network) has a specific Home Location Register (HLR) keeping track of all subscribers (including from other networks) allowed to access network PLMN-B, then missing information may be limited to the international mobile subscriber identity (IMSI), and this can be obtained from the MT itself.

With modifications on the terrestrial side, call records may be augmented to keep track of the time spent in each LAI in the call. For existing GSM-based architectures, this may require modifications of source MSC MSC-A, of the OMA node handling call records and of the exchange protocol between the two. This tracking of LAI might already be implemented for other reasons than inter-PLMN handovers.

In the above-described embodiments, modifications to support inter-PLMN handovers between two networks that already support inter-MSC handovers include: exchange of cell-related information between the two PLMNs, e.g., through OMCs; implementation of the routing SS7 tables allowing MSCs to route to each other, an already existing optional function; and recording of call time spent in different PLMNs in the same call.

A possible reason for not substantially following GSM practices is to minimize the impact on a PCS network in a handover from PCS to satellite. In such a case, the PCS is on the terrestrial side as described above with reference to FIG. 3. A way to reduce impact on the terrestrial side would be to remove the need to handle configuration data pertaining to the satellite network. One way is to have MT-triggered handovers. If this simplifies the terrestrial side for the handover decision, the impacts resulting from allowing the transfer, the re-routing from the source MSC-A to the destination MSC MSC-B may be very significant. Conventionally, GSM supports a form of MT-triggered handover (call re-establishment), but only inter-BSC, not inter-MSC. One reason is because of the complexity of the re-routing between two MSCs.

The timing advance resolution required in a conventional GSM TDMA system is 3.7 microseconds and is the inverse of the channel data rate (270 kbps) of GSM. At the speed of light, this corresponds to a propagation distance of 1.11 km. Further, the GSM frame structure allows approximately 8 channel bits for guard time in the traffic channel bursts. This means that, if the range to the satellite from the base station is known to approximately this resolution, and if the distance of the MT from the base station is also known to this resolution, the combined error will be well within the specified guard time of 8 channel bits.

According to some embodiments of the present invention, the following approach may be used for establishing a priori information about the timing advance. GSM is used as an example but the principles could be applied to other air interfaces containing a TDMA component, or any kind of time-framing component, as is present in CDMA2000 (including EVDO), WCDMA and WiMax, and satellite adaptations of the above air interfaces, where time epochs of waveforms transmitted from a plurality of mobile satellite terminals distributed over a large geographic area may be aligned.

The location of the base station tower may be surveyed and determined to a requisite accuracy. During a terrestrial-to-satellite handover, the location of the base station tower may be indicated to the satellite network, which, in turn, may tell the terrestrial BSC/BTS the current range of the satellite. While satellites in geostationary orbit nominally maintain a fixed orbital location relative to the Earth, in practice, their orbital location describes a figure-of-eight pattern about the nominal location, with a periodic North-South and East-West variation. These variations are slow compared to the time epochs in an air interface, such as GSM, and can be predicted quite accurately as a function of absolute time. Thus, predicting the range to the satellite from the BTS tower is feasible. Based on the latter, the terrestrial BSC may, in the handover command to the MT, advise it of the timing advance to use on the satellite link.

According to some embodiments of the present invention, the base station tower may be used as an approximation for the MT position. Owing to the requirements of E911 and location based services, this information is often available in the terrestrial wireless communication system, either at the MT or at the BTS/MSC or both. If the MT position information is available, it may be used instead of the base station tower location with a corresponding increase in the handover performance. The MT position information may be obtained in a variety of ways. For example, determination of MT position may encompass the use of Global Positioning Satellites (GPS) and/or triangulation from multiple base stations. All methods of MT geolocation are within the scope of the present invention.

Figure 4:
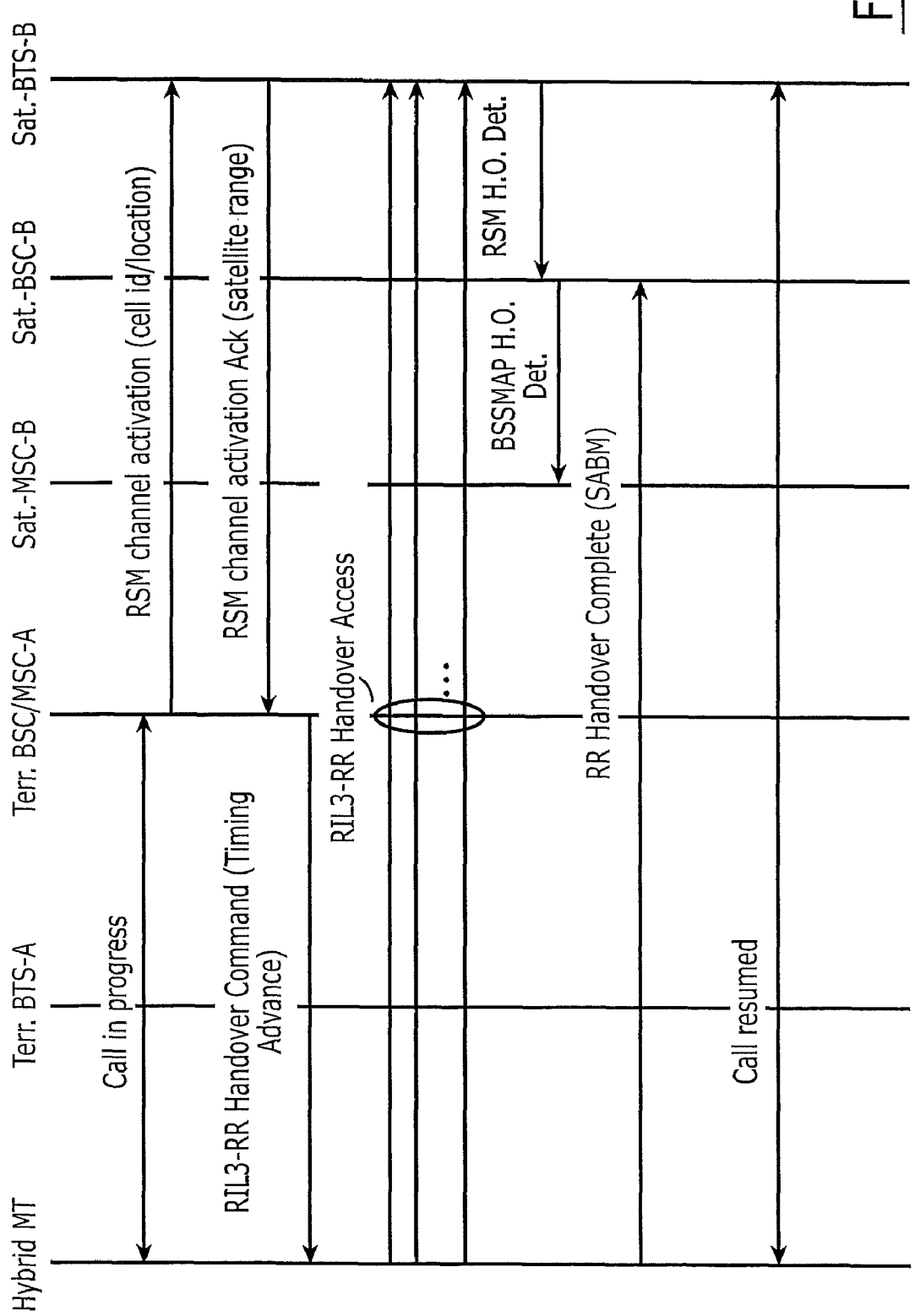

FIG. 4 shows a handshaking protocol that may be used to implement synchronous handover using a priori information as described above according to some embodiments of the present invention. The initial phase of the exchange is "call in progress" between the MT and the terrestrial infrastructure, comprising the terrestrial base transceiver station (BTS) BTS-A, terrestrial BSC BSC-A and terrestrial MSC MSC-A. Based on signal strength quality measurements performed by the MT and terrestrial BTS BTS-A, and possibly other criteria, a decision is made by terrestrial BSC BSC-A to handover the call to the satellite network. A "RSM Channel Activation" message is sent to the satellite BTS BTS-B via the hybrid network's core, which includes both the terrestrial core network and the satellite core network (including the satellite MSC MSC-B and the satellite BSC BSC-B). According to some embodiments of the present invention, the cell identity may be included in this message. The information may be included, for example, as the latitude and longitude of the base station tower or as a base station tower ID which points to similar information in a database carried by the satellite gateway.

On receipt of the RSM Channel Activation message, the satellite network allocates radio resources (power, frequency and bandwidth) to the new call and responds with a "RSM Channel Activation Acknowledgement" message from satellite BTS-B back to the terrestrial infrastructure (e.g., BTS-A/BSC-A/MSC-A). The current satellite range from the satellite gateway may be included in this message. Knowing its own location and the location of the satellite gateway, the terrestrial BSC BSC-A may calculate the range to the satellite from the base station tower. Based on this calculation, BSC-A may also calculate the timing advance that the MT should use on the satellite channel. This information may be communicated to the MT as a part of a modified "RIL3-RR Handover Command" message. In the above discussion, the satellite may be viewed as an equivalent of the BTS tower in a handover context. For timing advance and handover functions, the time reference may be established at the satellite, not at the satellite gateway, although the latter is where the signal demodulation and modulation may be performed. This is because differential time delays with respect to different mobile terminals exist only with respect to the satellite—the transit delay between the satellite and the gateway is identical for all mobile terminals.

As an alternative to the techniques described above, in order to reduce changes to terrestrial infrastructure, the timing advance may be calculated by the satellite BSC BSC-B using knowledge of the cell tower's location supplied in the "RSM Channel Activation" message and the timing advance information supplied to terrestrial BSC BSC-A in the "RSM Channel Activation Acknowledgement." Other variations of how the computation of timing advance is distributed may be implemented in other embodiments of the invention.

On receipt of the handover command with the timing advance, the MT proceeds to send access probes, called "RIL3-RR Handover Access," on the satellite channel. These probes can be used to confirm to the satellite BTS BTS-B that the correct MT is using the channel and that the correct timing advance is being used. These probes are optional. After sending a predetermined number of probes, the MT may send a "RR Handover Complete" message to the satellite BSC BSC-B and resume traffic communication on the satellite channel. Ancillary messages between the satellite and terrestrial subnetworks, reflecting GSM practice, are also shown in FIG. 4. These may switch the call on the core network side in an orderly manner.

When the destination network involves a long-delay channel, such as a satellite channel, the extent of handshaking in legacy protocols, such as GSM, may introduce an excessively long delay between the onset of handover and the time when the timing advance is known to the MT. During this time, no communication path may be available from the MT to the core networks of either the terrestrial or satellite subnetworks. This may be perceived by the user as a temporary loss of signal. Such delay could be 750 ms or greater, which would tend to produce a negative user experience. By anticipating this delay and delaying the switchover of the traffic channel from the originating to the destination channel, the problem may be mitigated.

According to some embodiments of the invention, a predetermined delay is introduced in the communication of an acknowledgement signal from a MT to a terrestrial BSC responsive to a handover command message from the BSC. For example, in some exemplary embodiments of the invention, a 500 ms delay is provided in sending an ACK message from the MT in response to a RR Handover Command message from a terrestrial BSC. This ACK causes the terrestrial path to be shut down. The delay may be set at the minimum possible time that would be required to determine and communicate the new timing advance to the MT, e.g., a 250 ms propagation delay for the first "RR Handover Access" message from the MT to the Satellite BSC and another 250 ms propagation delay from the Satellite BSC to the MT. Even if the MT started transmitting traffic immediately on the satellite channel on receipt of RR Physical Info, there could be another 250 ms propagation delay before the traffic signals would reach the satellite core network, resulting in the above mentioned net delay of 750 ms.

According to some embodiments of the present invention, when a handover occurs from terrestrial network to satellite network or within satellite networks, the MT is already pre-synchronized with the target cell or spotbeam. The example shown below is for a hybrid satellite/terrestrial system employing geostationary satellite(s). It will be appreciated that the specific times discussed herein are provided for exemplary purposes, and that the present invention encompasses systems and methods using other times.

For emission from a MT, a timing advance may be used. A coarse timing advance (CTA) may be independent from the MT position, and can be sent in a HANDOVER COMMAND message. The MT may determine a Fine Timing Advance (FTA) before starting emission.

Two possible solutions for determining FTA include:
1) The satellite gateway BSC computes the Fine Timing Advance only on the basis of the Terrestrial ATN or PCS Cell Id. The Fine Timing Advance can then be provided to the MT by the satellite gateway BSC in the HANDOVER COMMAND message between satellite gateway and terrestrial network (PCS and ATN). This may entail that each network will have to provide to the satellite system operators a detailed radio coverage map. Furthermore, terrestrial cell may need to be small enough to take into account the delay variations within a terrestrial cell (FTA computed on cell center position).
2) An S-RACH message is sent to the satellite gateway in order to compute the Fine Timing Advance of the terminal. This solution is explained below and takes place after the reception of RR HANDOVER COMMAND message.

When a network control center (NCC) detects a random access transmission from the MT, it may determine the delay advance of the MT signal relative to a signal timing that would be expected from a MT relative to the coarse timing advance. The delay may be assessed in such a way that the assessment error (due to noise and interference as well as all timing uncertainties in the RF/IF and signaling equipment paths within the NCC) is less than ¼ return bit periods for stationary MT and for MT moving at speeds up to 100 km/h. The gateway may derive a FTA parameter equivalent to the delay.

When the MT accesses the radio resource(s) of the new base station subsystem (BSS) with a HANDOVER ACCESS burst which contains the received handover reference number:

1) the new BSS may check the handover reference number to ensure that it is the same as expected, and hence that there is a high probability that the correct MT has been captured (if the handover reference is not as expected then the new BSS shall wait for an access by the correct MS);
2) if the handover reference number is as expected, the new BSS may send a HANDOVER DETECT message to the MSC;
3) when the MT is successfully in communication with the network, e.g., the RR message HANDOVER COMPLETE has been received from the MT, then the new BSS may immediately send a BSSMAP message HANDOVER COMPLETE to the MSC; and
4) the SEND END SIGNAL may be sent to the anchor MSC in order to terminate the procedure.

A time interval (e.g., t least 500 ms) may be necessary for the FTA allocation (e.g., best case when the first HANDOVER ACCESS message is handled by the satellite gateway). But only uplink (from MT to gateway) may be impacted by the post synchronization issue. As a stream of RR HANDOVER ACCESS messages is sent by the MT to the new BSS, a short interval (e.g., a few milliseconds) may be needed to complete the procedure if the first message is not answered (worst case). A longer interval (e.g., 250 ms) may be needed between MT transmission and gateway reception after handover.

Even though a delay (e.g., 750 ms) can be a constraint to a seamless handover for post-synchronization purposes, according to some embodiments of the present invention, existing post handover synchronization procedures used in GSM may be used in a hybrid system by modifying these procedures to include such a delay. In order to provide a seamless handover from terrestrial to satellite mode, the proposed post synchronization phase may require modifications in relation to GSM procedures. The time necessary to complete post handover synchronization takes into account long satellite transmission delay.

In post handover synchronization phase in a conventional GSM environment, an MT receives and transmits speech/data with a first BSC until the reception of the RR HANDOVER COMMAND message. Then the MT waits for the RR PHYSICAL INFO of a second BSC in order to re-start speech/data reception/transmission on the target cell. In a conventional terrestrial GSM environment, only few milliseconds of suspended transmission/reception typically are necessary and this generally has no impact on user perception of call continuity.

In a hybrid terrestrial-to-satellite handover using such an approach, a MT may:

1) send a RR HANDOVER ACCESS to the satellite BSC (e.g., about 250 ms);
2) suspend transmission and reception with the terrestrial system and wait for RR PHYSICAL INFO (e.g., about 250 ms); and
3) start reception/transmission with the satellite network (e.g., about 250 ms between transmission from MT or gateway and reception on the other side).

As a consequence, more than 750 ms may be used to complete post synchronization. It may be noted that Layer 2 exchanges (SABM-UA) may happen during communication phase after the MT is in the satellite-connected mode. As a result, SABM and UA messages for the satellite delay do not need to be taken into account.

Figure 5:
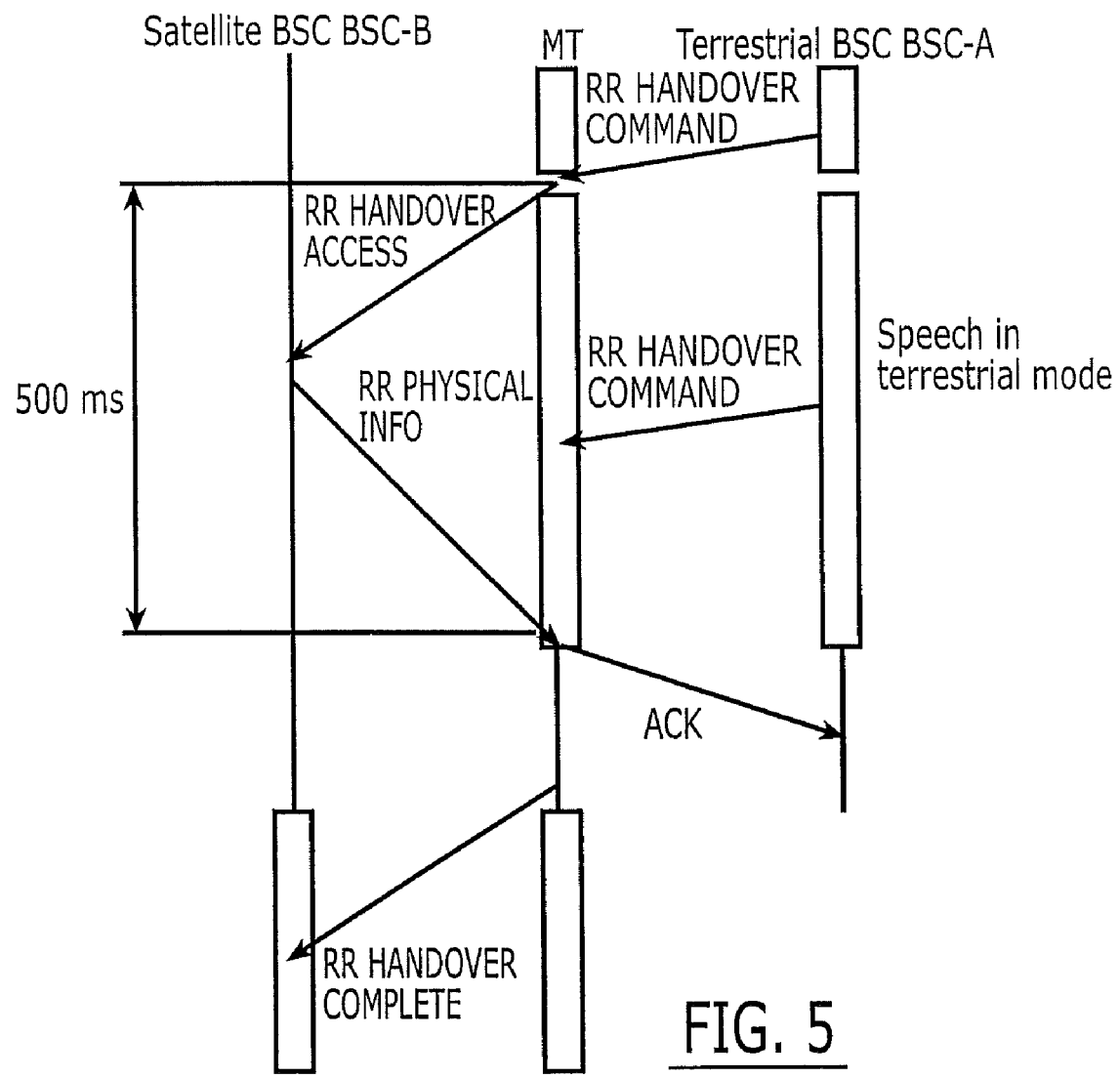
FIG. 5 illustrates operations for terrestrial/satellite handover according to some embodiments of the present invention.

According to some embodiments of the present invention illustrated in the message flow diagram of FIG. 5, in order to reduce the time in which transmission/reception are suspended, shutdown of the traffic channel with the terrestrial system is delayed for a time sufficient to allow all or most of synchronization operations needed to initiate communications with the satellite system while allowing the MT to continue transmission/reception with the terrestrial system. In some embodiments, for example, a timer (e.g., a 500 ms timer) is started when a MT receives from terrestrial network BSC BSC-A the RR HANDOVER COMMAND. The MT doesn't immediately send an ACK message to the terrestrial BSC BSC-A. Instead, the MT switches to the satellite frequency and transmits the RR HANDOVER ACCESS message to the satellite BSC BSC-B. Then, within terrestrial network, the MT may continue radio transmission and reception, which is possible because the ACK message has not been received by the terrestrial BSC BSC-A. This is not a conventional GSM procedure. When timer expires, the ACK message is sent to the terrestrial BSC BSC-B and the call is handed over to the satellite BSC BSC-B.

The approach described above may be modified by making the delay variable rather than fixed. For example, for the example of FIG. 5, instead of waiting for expiration of a predetermined time interval, the delay may be terminated by the receipt of a RR Physical Info message from the Satellite BSC BSC-B. If the first RR Handover Access message is not received correctly by the satellite BSC BSC-B, the ACK may be delayed by additional rounds of handshake delays until the new path is truly open. Whether a fixed or variable delay is used may, for example, depend on the tolerance of the terrestrial infrastructure for departures from legacy practices. Some embodiments of the invention may combine both approaches.

Figure 6:
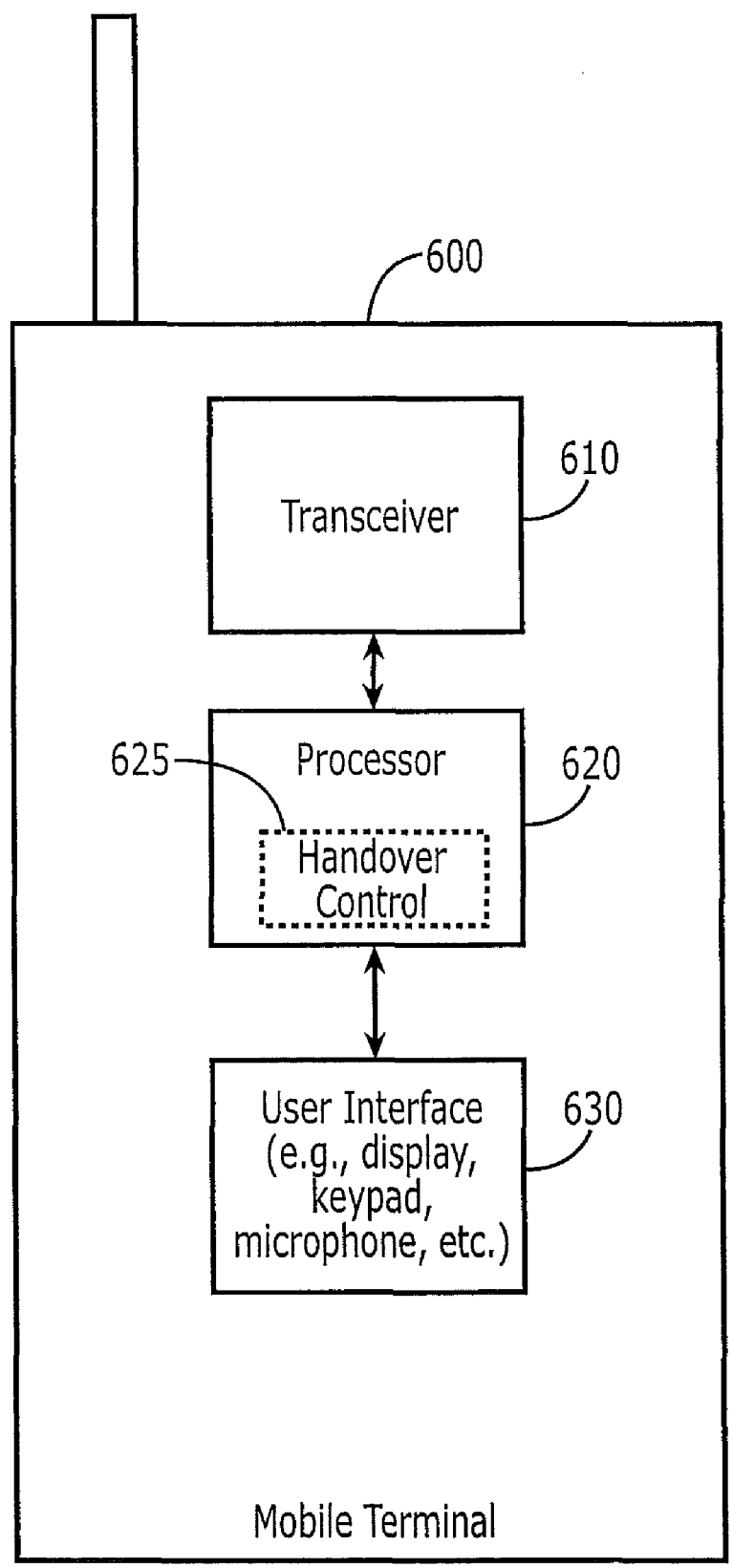
FIG. 6 illustrates a radioterminal according to some embodiments of the present invention.

FIG. 6 illustrates a radioterminal 600 according to some embodiments of the present invention. The radioterminal 600 includes a radio transceiver 610 operatively associated with a processor 620 configured to support radio communications with satellite and terrestrial networks via the transceiver 610 as discussed above with reference to FIGS. 1-5. In particular, the processor 610, e.g., a microprocessor, microcontroller, digital signal processor (DSP) or the like, is configured to implement a handover control process 625 that may implement handover control functions, such as signal strength measurements, handover candidate channel identification, handover message interpretation and generation, and other functions along the lines discussed above with reference to FIGS. 1-5. As shown, the processor 620 may also be configured to interoperate with user interface circuitry 630, such as a display, keypad, microphone, speaker, etc.

It will be appreciated that the apparatus and operations described above are illustrative examples, and that other architectures and operations fall within the scope of the present invention. More generally, in the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of handing over communications of a radioterminal from a terrestrial wireless communications system to a satellite wireless communications system, the method comprising: communicating a handover command message from the terrestrial wireless communications system to the radioterminal; and responsive to receipt of the handover command message at the radioterminal, waiting a time interval before terminating a traffic channel between the radioterminal and the terrestrial wireless communications system, wherein waiting a time interval before terminating a traffic channel between the radioterminal and the terrestrial wireless communications system comprises waiting to transmit a handover acknowledgement message from the radioterminal to the terrestrial wireless communications system for a time interval sufficient to determine and communicate timing information for the satellite wireless communications system to the radioterminal from a satellite of the satellite wireless communications system.

2. The method of claim 1, wherein the time interval is sufficient to determine and communicate timing information for the satellite wireless communications system to the radioterminal.

3. The method of claim 2, wherein the timing information comprises timing advance.

4. The method of claim 1, further comprising determining the time interval responsive to receipt of a physical information message from the satellite wireless communications system at the radioterminal.

5. The method of claim 1, wherein terminating a traffic channel comprises communicating a handover command acknowledgment from the radioterminal to the terrestrial wireless communications system.

6. A radioterminal comprising: a handover controller configured to receive a handover command message from a terrestrial wireless communications system for handover to a satellite wireless communications system and to wait a time interval before terminating a traffic channel between the radioterminal and the terrestrial wireless communications system responsive to receipt of the handover command message at the radioterminal, wherein the handover controller is configured to wait to transmit a handover acknowledgement message from the radioterminal to the terrestrial wireless communications system for a time interval sufficient to determine and communicate timing information for the satellite wireless communications system to the radioterminal from a satellite of the satellite wireless communications system.

7. The radioterminal of claim 6, wherein the time interval is sufficient to determine and communicate timing information for the satellite wireless communications system to the radioterminal.

8. The radioterminal of claim 7, wherein the timing information comprises a timing advance.

9. A computer program product non-transitory computer-readable medium for controlling handover of a radioterminal from a terrestrial wireless communications system to a satellite wireless communications system, the computer program non-transitory computer-readable medium comprising computer program code embodied in a computer readable medium therein, the computer program code comprising: program code configured to receive a handover command message from the terrestrial wireless communications system and to cause the radioterminal to wait a time interval before terminating a traffic channel between the radioterminal and the terrestrial wireless communications system responsive to receipt of the handover command message at the radioterminal, wherein the program code configured to receive a handover command message from the terrestrial wireless communications system and to cause the radioterminal to wait a time interval before terminating a traffic channel between the radioterminal and the terrestrial wireless communications system responsive to receipt of the handover command message at the radioterminal comprises program code configured to cause the radioterminal to wait to transmit a handover acknowledgement message from the radioterminal to the terrestrial wireless communications system for a time interval sufficient to determine and communicate timing information for the satellite wireless communications system to the radioterminal from a satellite of the satellite wireless communications system.

10. The non-transitory computer-readable medium of claim 9, wherein the time interval is sufficient to determine and communicate timing information for the satellite wireless communications system to the radioterminal.

11. The non-transitory computer-readable medium of claim 10, wherein the timing information comprises a timing advance.

12. The method of claim 1, wherein the time interval is sufficient to determine and communicate timing information for the satellite wireless communications system to the radioterminal from a satellite of the satellite wireless communications system.

13. The method of claim 1, further comprising starting a timer in response to receipt of the handover command message and wherein waiting a time interval before terminating a traffic channel between the radioterminal and the terrestrial wireless communications system comprises waiting for expiration of the timer before terminating the traffic channel.

14. The method of claim 1, wherein waiting a time interval before terminating a traffic channel between the radioterminal and the terrestrial wireless communications system comprises waiting for receipt of timing information from a satellite of the satellite communications system at the radioterminal before terminating the traffic channel.

15. The method of claim 1, wherein the handover command message comprises a coarse timing advance for the satellite wireless communications system and wherein the time interval is sufficient to determine and communicate a fine timing advance for the satellite wireless communications system to the radioterminal.

16. The radioterminal of claim 6, wherein the time interval is sufficient to determine and communicate timing information for the satellite wireless communications system to the radioterminal from a satellite of the satellite wireless communications system.

17. The radioterminal of claim 6, wherein the handover controller is configured to start a timer in response to receipt of the handover command message and to wait for expiration of the timer before terminating the traffic channel.

18. The radioterminal of claim 6, wherein the handover controller is configured to wait for receipt of timing information from a satellite of the satellite communications system at the radioterminal before terminating the traffic channel.

19. The radioterminal of claim 6, wherein the handover command message comprises a coarse timing advance for the satellite wireless communications system and wherein the time interval is sufficient to determine and communicate a fine timing advance for the satellite wireless communications system to the radioterminal.

20. The non-transitory computer-readable medium of claim 9, wherein the time interval is sufficient to determine and communicate timing information for the satellite wireless communications system to the radioterminal from a satellite of the satellite wireless communications system.

21. The non-transitory computer-readable medium of claim 9, wherein the program code configured to receive a handover command message from the terrestrial wireless communications system and to cause the radioterminal to wait a time interval before terminating a traffic channel between the radioterminal and the terrestrial wireless communications system responsive to receipt of the handover command message at the radioterminal further comprises program code configured to start a timer in response to receipt of the handover command message and program code configured to cause the radioterminal to wait for expiration of the timer before terminating the traffic channel.

22. The non-transitory computer-readable medium of claim 9, wherein the program code configured to receive a handover command message from the terrestrial wireless communications system and to cause the radioterminal to wait a time interval before terminating a traffic channel between the radioterminal and the terrestrial wireless communications system responsive to receipt of the handover command message at the radioterminal comprises program code configured to cause the radioterminal to wait for receipt of timing information from a satellite of the satellite communications system at the radioterminal before terminating the traffic channel.

23. The non-transitory computer-readable medium of claim 9, wherein the handover command message comprises a coarse timing advance for the satellite wireless communications system and wherein the time interval is sufficient to determine and communicate a fine timing advance for the satellite wireless communications system to the radioterminal.

* * * * *